United States Patent
Krampitz

[19]

[11] Patent Number: 6,029,489
[45] Date of Patent: Feb. 29, 2000

[54] PROCESS AND DEVICE FOR DIVIDING AND/OR CUTTING OF THE WIRE ROLLING STOCK INTO A STRAND OF ROLLED WIRE AND PIECES OF SCRAP

[75] Inventor: Michael Krampitz, Magdeburg, Germany

[73] Assignee: SKET Walzwerstechnik GmbH, Magdeburg, Germany

[21] Appl. No.: 09/274,785

[22] Filed: Mar. 23, 1999

[30] Foreign Application Priority Data

Mar. 25, 1998 [DE] Germany ............... 198 12 992

[51] Int. Cl.$^7$ .............. B21B 1/00; B21D 45/00
[52] U.S. Cl. .............. 72/204; 72/426
[58] Field of Search .............. 72/203, 204, 419, 72/420, 426, 428; 83/102, 105

[56] References Cited

U.S. PATENT DOCUMENTS

| | | | |
|---|---|---|---|
| 3,969,668 | 7/1976 | Weinzinger et al. | 72/10 |
| 4,966,060 | 10/1990 | Poloni | 83/105 |
| 5,690,008 | 11/1997 | Pong | 83/26 |

FOREIGN PATENT DOCUMENTS

| | | |
|---|---|---|
| 0 297 313 | 6/1988 | European Pat. Off. . |
| 0 297 313 | 1/1989 | European Pat. Off. . |
| 129 127 | 12/1977 | Germany . |
| 145 237 | 12/1980 | Germany . |
| 145 503 | 12/1980 | Germany . |
| 35 23 046 | 2/1986 | Germany . |
| 218 852 | 10/1993 | Germany . |
| 197 30 375 | 1/1999 | Germany . |

Primary Examiner—Rodney A. Butler
Attorney, Agent, or Firm—Collard & Roe, P.C.

[57] ABSTRACT

A process and a device for dividing a strand of wire rolling stock and/or for cutting the strand of rolling stock into a wire rolling material strand and pieces of scrap by cropping and/or chopping, has the strand of wire rolling stock moving at a high speed of at least up to 80 m/s. The strand of wire rolling stock (1) is briefly and with high intensity deflected by an electromagnetic force "F" acting perpendicular to the actual direction of movement, in a way such that the strand (1) of wire rolling stock is either moved into or out of the acting range between two cutting heads (2a, 2b) for cutting the strand (1). The cutting heads are arranged with their axes parallel to each other and are rotating in opposite directions and each are fitted with at least one knife (3a, 3b).

7 Claims, 6 Drawing Sheets

6,029,489

PROCESS AND DEVICE FOR DIVIDING AND/OR CUTTING OF THE WIRE ROLLING STOCK INTO A STRAND OF ROLLED WIRE AND PIECES OF SCRAP

BACKGROUND OF THE INVENTION

1. Field of the Invention

The present invention relates to a process and a device for dividing and/or cutting of wire rolling stock into a strand of rolled wire and pieces of scrap by cropping and/or chopping, whereby the wire rolling stock is capable of moving at high speeds of up to at least 80 m/s.

2. The Prior Art

It is known to divide or to crop and/or chop a moving strand of wire rolling stock in rolling trains at rolling speed, for example in order to enhance the conditions of the initial pass in the rolling strands downstream. It is also possible to separate sections not meeting the quality requirements and deposit such sections as scrap.

The strands of rolling stock are preferably cut by means of flying shears, which are adapted to the high rolling speeds. These shears have been disclosed in different design variations. According to DD 129 127, DD 145 237, and DD 218 852, such shears substantially consist of two cutting heads arranged with parallel axles and rotating in opposite directions. The cutting heads each are fitted with at least one knife for cutting the strand of rolling stock and have thread-like caliber grooves for forcibly guiding the strand of rolling stock into the actual cutting range of the knives. On the rolling stock inlet side, the shears have a pivotable tube for introducing the strand of rolling stock into the acting range of the cutting heads.

EP 0 297 313 B1 discloses another set of shears having a pivotable tube.

It is common to all of these prior art devices that the pivotable tubes are operated by means of complicated and costly mechanical systems. In particular, there are linear drives in the form of hydraulic or pneumatic cylinders, or there are electric motors, moving worm gears, or a combination of such drives.

Due to the high rolling speeds and the forces of acceleration as well as the required minimal switching times, these systems can be controlled and mechanically managed only at a [technical expenditure]. Furthermore, the complicated and costly thread-like caliber regions of the cutting heads are characterized by high wear.

SUMMARY OF THE INVENTION

It is an object of the present invention to overcome the drawbacks described above and to provide a process and a device for cutting wire rolling stock which may have rolling speeds of up to at least 80 m/s. The device is suitable to assure the safe cutting of a strand of rolling stock with minimal expenditure in terms of machine and control engineering. In particular, complicated and cost-intensive mechanical systems for forcibly guiding the strand of rolling stock into the cutting line are not needed. These prior art systems are susceptible to both wear and failure, are dispensed with, and are replaced by novel technologically active mechanisms that are suitable for the future development of increasingly higher rolling speeds.

The above objects are achieved according to the present invention by providing a process for dividing and cutting a wire rolling stock strand into a rolling material strand and scrap pieces by cropping and chopping, comprising the steps of moving the wire rolling stock strand in an actual direction of movement at a high speed of at least up to 80 m/s; deflecting the wire rolling stock strand briefly and with high intensity by means of an electromagnetic force "F" acting perpendicular to the actual direction of movement, in a way selected from the group consisting of (A) such that the wire rolling stock strand is moved into an acting range between two cutting heads for cutting the rolling strand, said cutting heads being arranged with axes parallel with each other and rotating in opposite directions and each being fitted with at least one knife; and (B) moving the wire rolling stock strand out of the acting range of the cutting heads.

It is another embodiment of the invention that the electromagnetic force "F" is applied by the flow of an electric current through the strand of rolling stock as well as by a current conductor. This conductor is arranged in a fixed position opposite the rolling stock in about the same plane. The force "F" will cause the deflection of the strand of rolling stock away from the current conductor.

In a further embodiment of the invention, the point in time of the deflection of the tip of the strand of rolling stock is exclusively determined by the tip of the strand of rolling stock itself. This is due to the closing of the two contact electrodes of the current conductor, in the form of free spark discharges. For cutting the end of a strand of rolling stock or parts of the strand, the strand is deflected due to the closing of two contact electrodes of the current conductor. This occurs in such a way that a loop is formed, which in turn runs into the acting range of the cutting heads.

In another embodiment of the invention, the rotational speeds of the cutting heads are synchronized with the speed of the moving strand of rolling stock in such a way that a cross movement of the strand of rolling stock takes place. This occurs in a previously fixed graduated circle of at least one cutting head, with the graduated circle being constructed in such a way that an unobstructed cross movement becomes realizable.

The device for achieving these objects for dividing and cutting a wire rolling stock strand into a rolling material strand and scrap pieces by cropping and chopping comprises means for moving the wire rolling stock strand at a high speed of up to at least 80 m/s; two cutting heads for cutting the strand of wire rolling material, said cutting heads being positioned in a cutting line with each having an axis parallel to the axis of the other and said heads rotating in opposite directions; each cutting head being fitted with at least one knife; one cutting head having a leading knife and another cutting head having a trailing knife; at least one cutting head, viewed in a direction of rotation, has a graduated circle determined by an angle "alpha", said graduated circle directly trailing the associated knife and having such a radial jump relative to a lower graduated circle that an unobstructed cross movement of the rolling strand into the acting range of the cutting heads or out of said acting range is realizable; means located on an inlet side of the wire rolling strand for moving the rolling strand into an acting range of the cutting heads or out of said acting range into a rolling material line; said means for moving the rolling strand into the acting range of the cutting heads or out of the acting range of the cutting heads comprising two current conductors positioned stationarily opposite each other in approximately a same plane; said two current conductors each are located with an axis of each parallel to the other for metering an electromagnetic force "F" onto the wire rolling stock strand by regions, at an angle relative to the associated axis of movement of the rolling strand; and means located on an outlet side of the rolling strand for guiding the rolling strand to processing stations downstream and for receiving pieces of scrap.

In a further embodiment of the invention, each electrical current conductor has two contact electrodes which in turn are each connected to each other via a current source, a capacitor and a triggered switching spark gap. These contact electrodes are arranged with such a spacing in the horizontal line relative to the strand of rolling stock that a free spark discharge to the strand of wire rolling stock is producible.

In another embodiment of the invention, the rolling speed of the strand of rolling stock and the rotational speeds of the cutting heads are synchronized with each other. This synchronization occurs in such a way that it depends on the size of angle "alpha" of the radial jump and the spacing "f" of the current conductor for the movement of the strand of rolling stock into the acting range of the cutting heads. Thus an unobstructed movement of the strand of rolling stock both into the acting range of the cutting heads and out of this range of the cutting heads is assured.

In a further embodiment of the invention, for the movement of the strand of rolling stock out of the acting range of the cutting heads, the current conductor can be contacted for a short time. This contact is with one of the two, or with both, of the cutting heads by means of a contact electrode via small electrode spacings "e" or associated slide contacts. The contact electrode is positioned close to the cutting heads.

It is furthermore desirable if the contact electrodes are U-shaped for assuring safe ignition of the free spark discharge onto the surface of the strand of rolling stock.

In another embodiment, the cutting heads are positioned with parallel axes relative to each other in the cutting line. The cutting heads are slanted in the horizontal plane by a defined angle γ relative to the line of the strand of rolling stock. Also, the cutting heads are slanted by a defined angle δ relative to the cutting line in a way such that the pieces of scrap are safely moved between cuts in the direction of a scrap receiver.

The advantages produced by the invention particularly include that it is possible to dispense with complicated and costly working of the cutting heads for producing, for example thread-like caliber grooves, as well as with rapidly moving mechanical components as found in prior art systems. This is because such components can be omitted due to the movement of the strand of rolling stock into the acting range of the cutting heads by an electromagnetic force "F", which was unknown heretofore. The electric energy is directly employed as an acting energy in order to move freely selectable segments of the strand of rolling stock crosswise and to subsequently cut such segments mechanically. Furthermore, the space required for the devices for moving the strand of rolling stock is small because of the high reaction speed of the electric system.

BRIEF DESCRIPTION OF THE DRAWINGS

Other objects and features of the present invention will become apparent from the following detailed description considered in connection with the accompanying drawing which discloses several embodiments of the present invention. It should be understood, however, that the drawings are designed for the purpose of illustration only and not as a definition of the limits of the invention.

In the drawing, wherein similar reference characters denote similar elements throughout the several views.

DETAILED DESCRIPTION OF PREFERRED EMBODIMENTS

Figure 1:
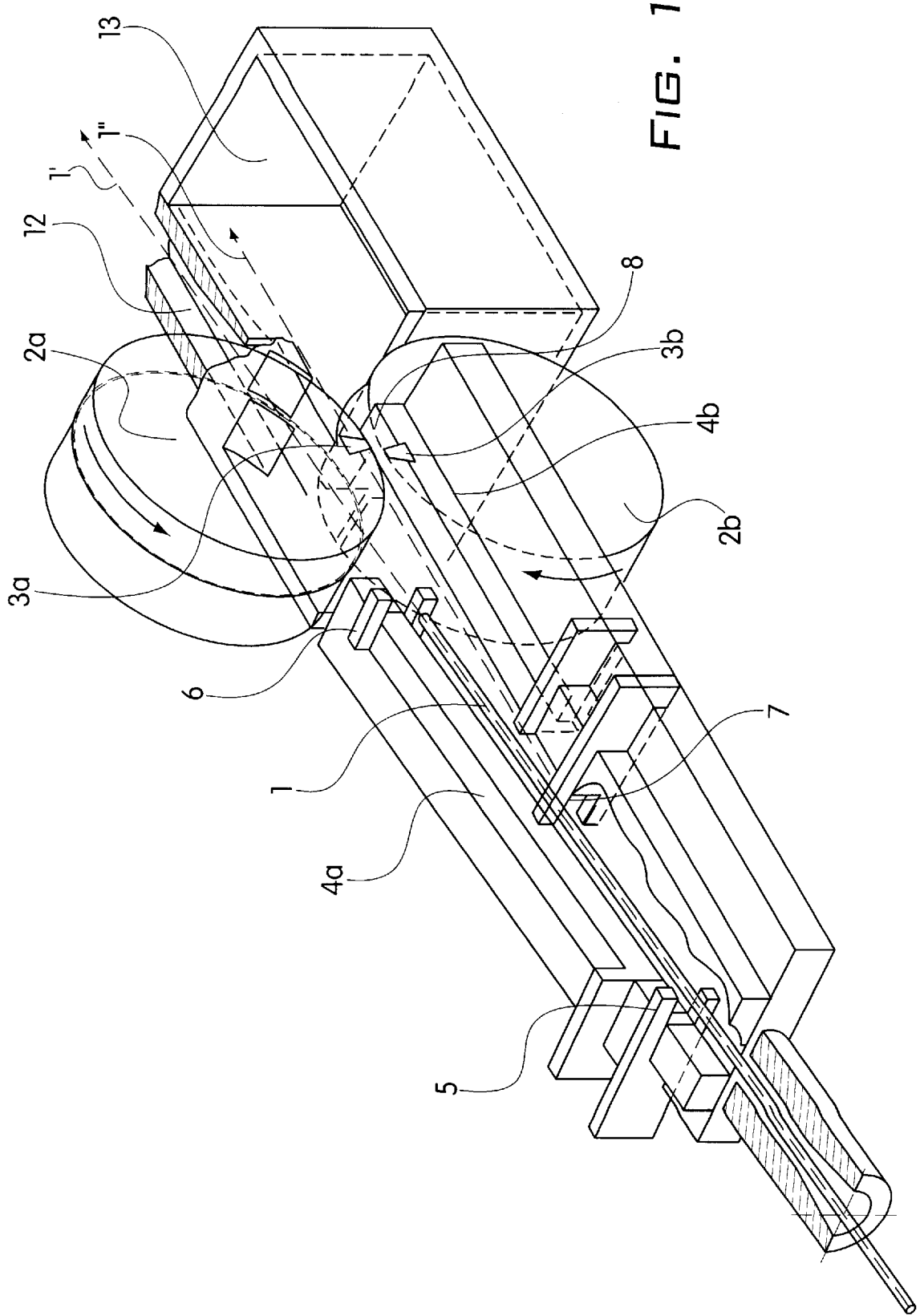
FIG. 1 is a perspective view of the device of the invention shortly before the strand of rolling stock is moved from the line of the rolling stock into the cutting line.
Figure 2:
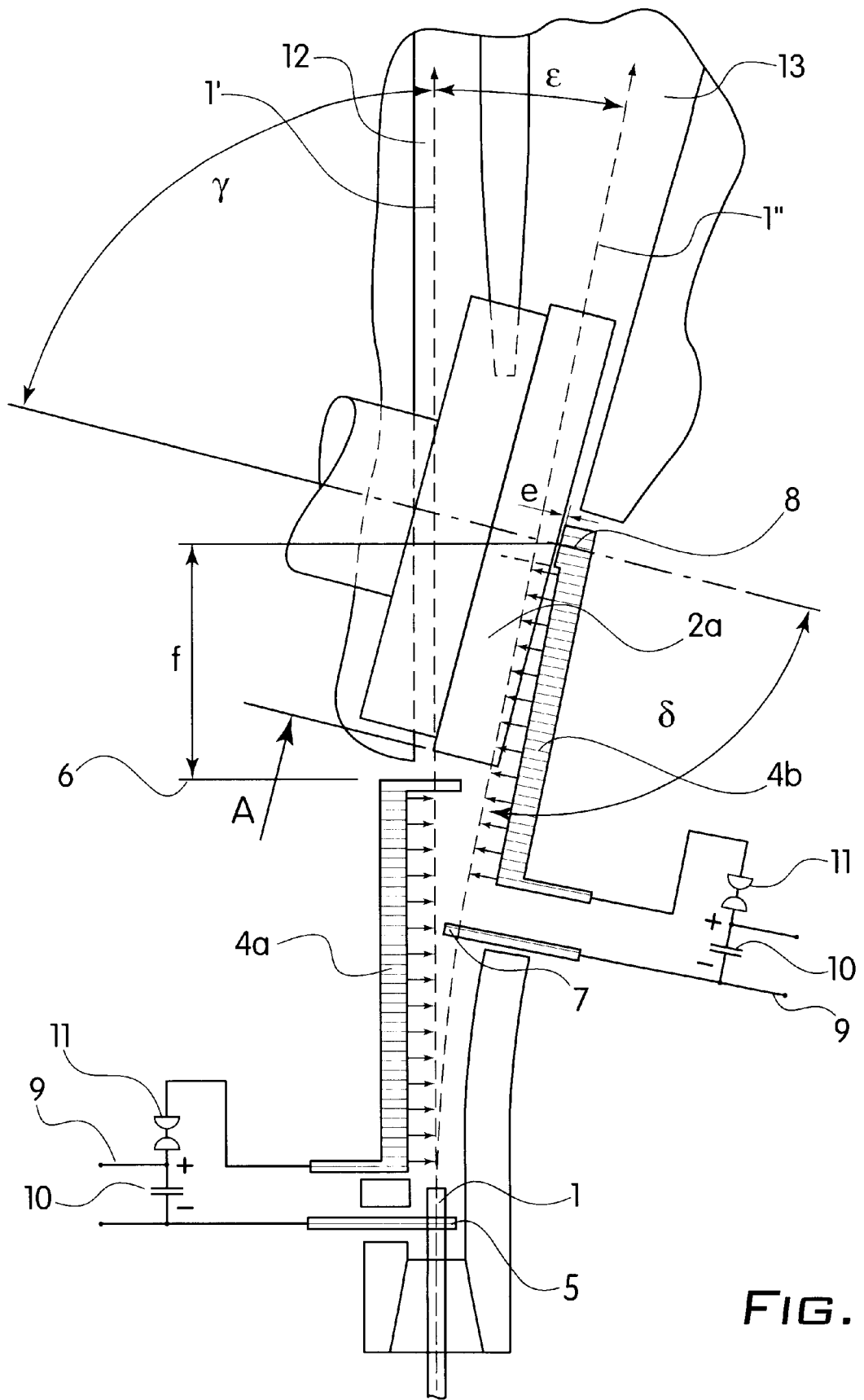
FIG. 2 is a top view of the device according to FIG. 1.

Turning now in detail to the drawings, FIGS. 1 and 2 show a device for dividing a strand of rolling stock 1 and/or for cutting rolling stock strand 1 by cropping and/or chopping comprising two cutting heads 2a and 2b, which are arranged with parallel axles relative to each other and which rotate in opposite directions. These cutting heads each comprise two coaxially arranged regions, which are solidly joined with each other. Thus one region is provided for the free passage of the rolling strand 1, and the other region is for driving and cutting the rolling strand 1. These regions are substantially characterized by a difference in the diameter. Specifically, the diameter of the region for the passage of rolling strand 1 is selected to be sufficiently large such that rolling strand 1 is guided in the region of the passage with a free horizontal mobility but vertical stability. In the region for driving and cutting the rolling strand 1, safe driving of the strand 1 is assured by slight contact pressure. At least one knife 3a, 3b for cutting rolling strand 1 is located on the outside circumference of cutting heads 2a, 2b for driving and cutting the rolling strand 1. In the present preferred embodiment of the device according to the invention, the upper cutting head 2a has the leading knife 3a, and the lower cutting head 2b has the trailing knife 3b. However, this arrangement is not necessarily required, since a reverse arrangement is suitable as well.

On the side of the rolling stock inlet, devices for moving rolling strand 1 into the acting range of cutting heads 2a, 2b or out of this acting range are arranged upstream of the cutting heads 2a, 2b. These devices are formed by two current conductors 4a, 4b, which are positioned and are fixed and opposite to each other in about the same plane. These current conductors are each arranged with their longitudinal axes parallel with or at a useful angle relative to the associated longitudinal axis of movement of the wire rolling stock 1. The axis of movement of wire rolling stock 1 may be disposed in rolled wire line 1', or in cutting line 1" of cutting heads 2a, 2b. Each current conductor 4a, 4b has two contact electrodes 5 and 6, and 7 and 8, respectively, which in turn are electrically connected to each other via a current source 9, a capacitor 10, and a triggered switching spark gap 11. Current conductor 4b for moving wire rolling stock 1 out of the acting range of cutting heads 2a, 2b can be contacted with one of the two or with both cutting heads 2a, 2b by means of its contact electrode 8. Electrode 8 is arranged near cutting heads 2a, 2b via small electrode spacings "e", or via slide contacts, which are not shown here in detail but are known (FIG. 2).

On the side of the wire rolling stock outlet, a device for guiding the wire material strand 1a in the form of a guide duct 12 for further processing is associated with cutting heads 2a, 2b downstream in wire material line 1'. A container in the form of a scrap receiver 13 for receiving the separated scrap pieces 1b is associated with the cutting heads in cutting line 1".

The method of operation of the invention is described in greater detail as follows.

As shown in FIG. 1, rolling stock 1 is moved into the device of the invention and on its way passes contact electrode 5. The tip of the wire rolling stock then reaches contact electrode 6. The spacing between the tip of the wire rolling stock and contact electrode 6 may fall short of a critical range required for igniting a spark discharge when a usefully selected high voltage is applied. If this happens, then capacitor 10, which was previously charged, is discharged via switching spark gap 11, which then functions as a closed switch, resulting in spark discharge on contact electrodes 5 and 6 and closing of the electric current circuit.

Figure 3:
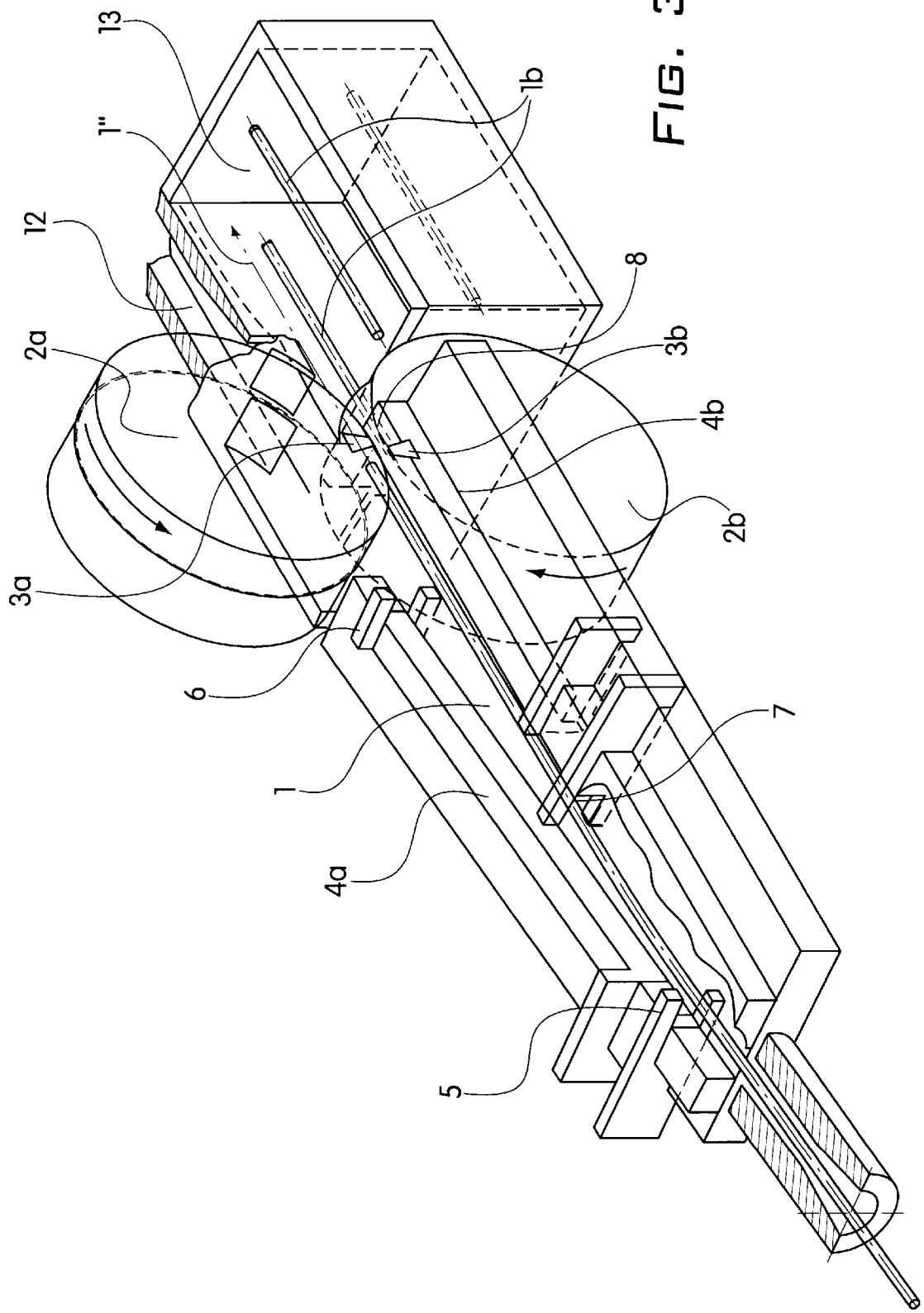
FIG. 3 shows the device according to FIG. 1 in the process of cutting the strand of rolling stock.

With an electrode spacing relative to wire rolling stock 1 of 10 mm at the most, which was found to be suitable, an operating voltage of from 10 to 30 kV is required. The magnetic fields generated both in wire rolling stock 1 and current conductor 4a create a repelling electromagnetic force "F" (FIG. 2). Force "F" acts on the current-conducting components with such a high intensity that it causes deflection of the tip of the wire rolling stock way from current conductor 4a. This occurs within such a short time that the tip or head of the wire rolling stock runs into cutting line 1" of the device of the invention (FIG. 3). The point in time of the deflection of the tip or head of wire rolling stock 1 is exclusively determined by the tip or head itself due to the closing of the two contact electrodes 5, 6 of the current conductor 4a.

For metering the electromagnetic force "F" onto the wire rolling stock 1 by regions, it is useful if the current conductor 4a is located at a useful angle, not shown in detail, relative to the associated axis of movement of wire rolling stock 1. The same applies to current conductor 4b, which is described in the following. Furthermore, contact electrodes 5 and 6 of current conductor 4a and contact electrode 7 of current conductor 4b are constructed to be U-shaped in order to assure safe ignition of the free spark discharge on the surface of wire rolling stock 1.

Figure 4:
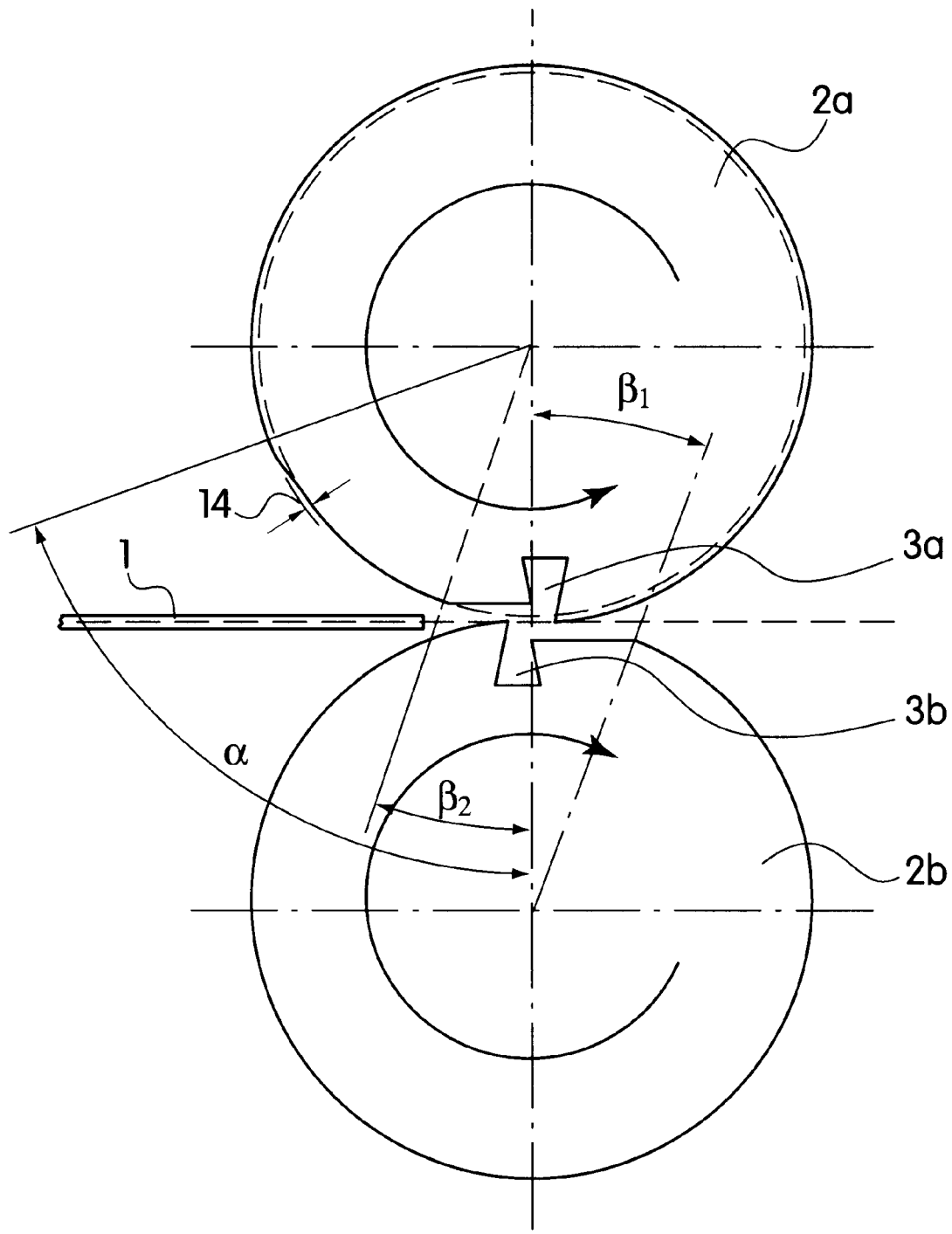
FIG. 4 shows the knife geometry according to a side view of the cutting heads.

In order to assure movement of the tip or head of the wire rolling stock into the acting range of cutting heads 2a, 2b, at least one cutting head, here the upper cutting head 2a, has (as shown in FIG. 4 when viewed in the direction of rotation) a graduated circle. This is determined by an angle "alpha" above a knife directly trailing, here knife 3a, the associated knife. The graduated circle has such a radial jump 14 relative to the lower one that this movement can take place without obstruction.

According to FIG. 3, the wire rolling stock has now been moved, with its head or tip leading, into cutting line 1". There it is admitted into the acting range of the cutting heads 2a and 2b and received by these cutting heads for cutting. In this situation, the wire rolling stock 1 is driven by means of these cutting heads 2a and 2b. As described above, each cutting head 2a or 2b has at least one knife, 3a, 3b positioned and fixed on the circumference of the cutting head to assure that the wire rolling stock 1 is safely sheared off in the cutting plane. FIG. 4 shows that viewed in the direction of rotation, the leading knife 3a of the upper cutting head 2a is followed by a free cut arranged downstream in circumferential region $\beta_2$. The trailing knife 3b of the lower cutting head 2b, has a free cut arranged upstream in circumferential region $\beta_1$ viewed in the direction of rotation. The sum of the angles alpha and $\beta_1$ determines as a function of the rolling speed the time during which wire rolling stock 1 is not driven by cutting heads 2a, 2b.

Practical tests have shown that an angle "alpha" between 60 and 90 degrees is desirable. Angles $\beta_1$ and $\beta_2$ are determined by the diameter or thickness of wire rolling stock 1 and the diameters of cutting heads 2a, 2b. For example, for cutting heads 2a, 2b with a diameter of about 200 mm and with a wire rolling stock diameter of 5.5 mm, angles $\beta_1$ and $\beta_2$ of 20 degrees <⊗> each are preferred. Due to the rotational motion of the cutting heads 2a and 2b and of the cooperating knifes 3a and 3b, wire rolling stock strand 1 can be cut as often as desired. The scrap pieces 1b, which are chopped pieces in the present case, drop into a scrap receiver 13, which is a simple container that is open at the top. Preferred is a scrap receiver 13 with a cyclone of the known type of design, with a scrap container arranged underneath.

In another embodiment, the cutting heads 2a, 2b are arranged with their axes parallel to each other in the cutting line 1". They are slanted in the horizontal plane by a defined angle γ relative to wire stock line 1", and by a defined angle δ relative to cutting line 1" (FIG. 2). This occurs in a way such that the scrap pieces 1b can be safely moved between cuts in the direction of scrap receiver 13. Angles γ and δ result from the function of the device of the invention. Angle γ is computed based on the preset scrap deflection angle ε and drive compensation angle δ according to the following equation:

$$\gamma = (90° - \epsilon) - (90° - \delta).$$

The δ angle has the preferred range of 1° to 2° and, by correcting the direction of transport, compensates for the time in <⊗> and with a wire rolling stock diameter of 20 mm, angles $\beta_1$ and $\beta_2$ of 40 degrees which wire rolling stock 1 is not driven by means of cutting heads 2a, 2b.

Figure 6:
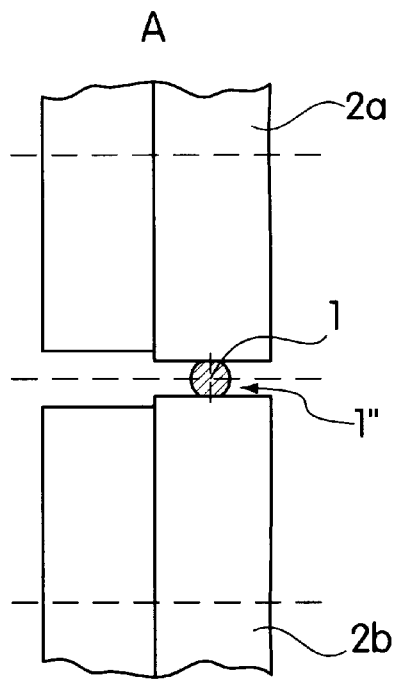
FIG. 6 shows the view A according to FIG. 2 in the course of the driving process of the strand of rolling stock.

FIG. 6 shows the embodiment of the driving process between the individual separation cuts, whereby wire rolling stock 1 is clamped between cutting heads 2a and 2b.

Figure 5:
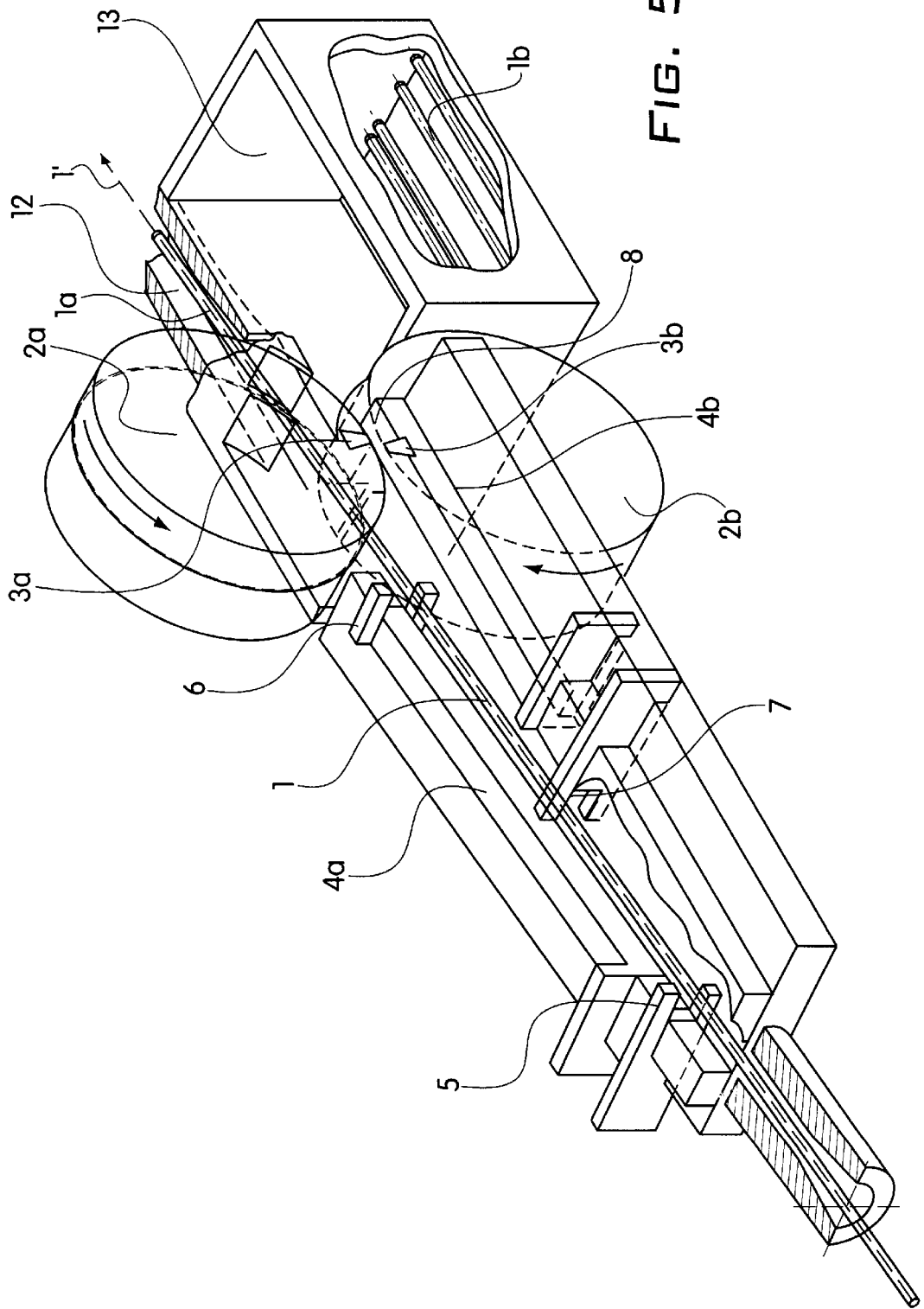
FIG. 5 shows the device according to FIG. 1 after the strand of rolling stock has been cut and as the strand of rolling material runs into the material line.

After the preselected length of the head of the wire rolling stock has been separated and cut off as scrap piece 1b, current conductor 4b is activated in synchronization with the position of the radial jump 14 of cutting head 2a (as shown in FIG. 2). Application of a useful high voltage which, in its effect is comparable with current conductor 4a, effects a deflection of the head or tip of wire material 1a. This deflection is away from current conductor 4b such that the tip or head runs into wire material line 1' of the device of the invention (FIG. 5). Deflection of wire material strand 1a takes place in this connection within the zone of the afore-described radial jump 14 of the upper cutting head 2a.

Figure 7:
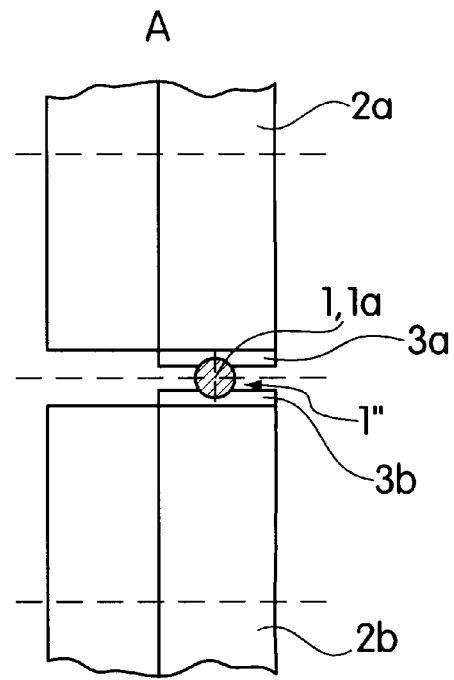
FIG. 7 shows view A according to FIG. 2 shortly after the strand of rolling stock has been cut.

FIG. 7 shows the situation shortly after the cut. Because of the radial jump 14, wire rolling stock 1 is no longer clamped between cutting heads 2a, 2b and therefore can be freely moved in the horizontal direction.

Figure 8:
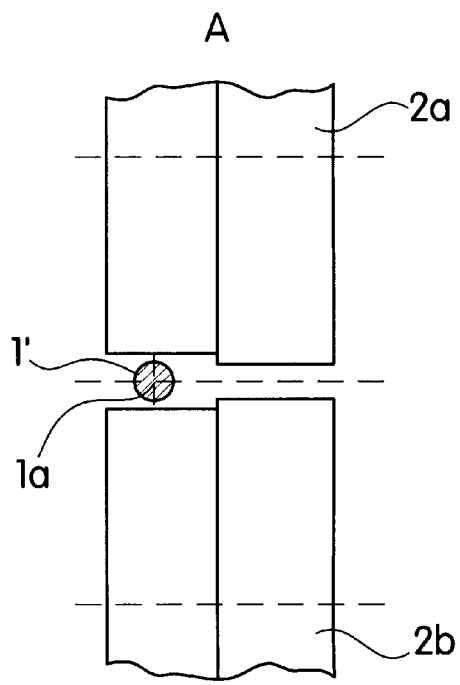
FIG. 8 shows view A according to FIG. 2 as the strand of rolling stock is running into the rolling material line.

FIG. 8 shows the point in time at which wire material 1 is guided between the above-mentioned zones of cutting heads 2a, 2b for free passage into wire material line 1'.

In a further embodiment, the rolling speed of wire rolling stock strand 1 and the rotational speeds of cutting heads 2a, 2b are synchronized with each other. Preferably these speeds are computer-controlled in such a way that unobstructed movement of rolling stock strand 1 both into the acting range of cutting heads 2a, 2b and out of this range is assured, depending on the size of angle "alpha" of the radial jump 14 and the spacing "f" of current conductor 4a from cutting heads 2a, 2b.

For dividing a wire rolling stock strand 1 and/or for cutting of an end of strand 1, the current conductor 4a is activated as described above. This occurs in such a way that a loop is formed in wire rolling stock strand 1 (the loop is not shown in the drawing), which loop then runs into cutting line 1" where it can be cut.

The end of rolling material strand 1a is subsequently pulled into rolling material line 1'. The cut-off end of wire rolling stock strand 1 is driven through cutting heads 2a, 2b as scrap piece 1b and is transported in the direction of scrap receiver 13.

Accordingly, while a few embodiments of the present invention have been shown and described, it is to be understood that many changes and modifications may be made thereunto without departing from the spirit and scope of the invention as defined in the appended claims.

What is claimed is:

1. A device for dividing and cutting a rolling strand into a stock strand and pieces of scrap by cropping and chopping comprising means for moving the rolling strand at a high rate of up to at least 80 m/s along an axis of motion;

two cutter heads, said cutter heads being positioned in one cutting plane with each having an axis parallel to the axis of the other and said heads rotating in opposite directions;

each cutter head having at least one cutter for cutting the rolling strand;

one cutter head having a leading cutter and another cutter head having a trailing cutter;

viewed in a direction of rotation, at least one cutter head (2a) has a graduated circle directly trailing the cutter (3a) of said cutter head and determined by an angle "alpha", said graduated circle having such a radial jump (14) to a lower graduated circle that an unobstructed cross movement of the rolling strand (1) into the acting range of the cutter heads (2a, 2b) or out of said range is realizable;

means located on an inlet side of the rolling strand for moving the rolling strand into an acting range of the cutter heads or out of said acting range into a rolling stock line;

said means for moving the rolling strand (1) into the acting range of the cutter heads (2a, 2b) or out of the acting range of the cutter heads (2a, 2b) comprising two current conductors (4a, 4b) positioned fixed and opposing each other in a same plane;

said two current conductors (4a, 4b) each are located with an axis of each parallel to the other or, for metering an electromagnetic force "F" into zones of the rolling strand (1), at an angle relative to the axis of motion of the rolling strand (1); and means located on an outlet side of the rolling strand for guiding the stock strand to further processing downstream and for receiving pieces of scrap; and wherein each current conductor (4a, 4b) has two contact electrodes (5,6;7,8), which in turn are connected with each other electrically and have such a spacing in a horizontal plane relative to the rolling strand (1) that a free spark discharge to the rolling strand (1) is producible.

2. The device according to claim 1, wherein the contact electrodes (5) and (6) of the current conductor (4a) and the contact electrodes (7) and (8) of the current conductor (4b) in each case are connected with another via a current source (9), a capacitor (10) and a triggered switching spark gap (11).

3. The device according to claim 1, wherein said means for moving the rolling strand (1) out of the acting range of the cutter heads (2a, 2b) comprising said current conductor (4b) contacted with one of the two, or with both, cutter heads (2a, 2b) by means of a contact electrode (8) positioned close to the cutter heads (2a, 2b), via small electrode spacings "e" or associated sliding contacts.

4. The device according to claim 1, wherein for assuring safe ignition of a free spark discharge on the surface of the rolling strand (1), the contact electrodes of each current conductor are U-shaped.

5. The device according to claim 1, wherein the cutter heads (2a, 2b) located with their axes parallel to each other in a cutting plane (1") are inclined in a horizontal plane by a defined angle γ relative to a stock strand plane (1') and by a defined angle δ relative to the cutting plane (1");

further comprising a scrap receptacle (13) and scrap pieces (1b) safely moved between cuts in the direction of said scrap receptacle (13).

6. A process for dividing the cutting a rolling strand into a stock strand and pieces of scrap by cropping and chopping, comprising the steps of moving the rolling strand in an actual direction of movement at a high rate of up to at least 80 m/s;

deflecting the rolling strand (1) briefly and with high intensity by means of an electromagnetic force "F" acting perpendicular to the actual direction of movement, in a way selected from the group consisting of (A) such that the rolling strand (1) is moved into an acting range between two cutter heads (2a, 2b), said cutter heads being arranged with axes parallel with each other and rotating in opposite directions and each having at least one cutter (3a, 3b) for cutting the rolling strand; and (B) moving the rolling strand out of the acting range of the cutter heads (2a, 2b); and applying the electromagnetic force "F" by a flow of an electric current through the rolling strand (1) as well as by a current conductor (4a) or (4b) stationarily arranged in approximately a same plane opposite said strand (1); and said electromagnetic force deflecting the rolling strand (1) away from the current conductor (4a) or (4b); and wherein a time of deflection of the rolling strand is determined by a closing of two contact electrodes (5,6) or (7,8) of the current conductor (4a) or (4b) in the form of free spark discharges.

7. The process according to claim 6, wherein the time of deflection of a tip of the rolling strand is exclusively determined by said tip of the rolling strand itself as a result of the closing of the two contact electrodes (5,6) or (7,8) of the current conductor (4a) or (4b) in the form of free spark discharges; and for cutting an end of the rolling strand (1) and for dividing the rolling strand (1), the strand is deflected due to the closing of two contact electrodes (5,6) of the current conductor (4a), in such a way that a loop is formed; and said loop in turn running into the acting range of the cutter heads (2a, 2b).

* * * * *

UNITED STATES PATENT AND TRADEMARK OFFICE
CERTIFICATE OF CORRECTION

PATENT NO. : 6,029,489
DATED : February 29, 2000
INVENTOR(S) : Michael KRAMPITZ

It is certified that error appears in the above-indentified patent and that said Letters Patent is hereby corrected as shown below:

On the cover page, column 1, item [73], the name of the assignee correctly should be spelled -- SKET Walzwerkstechnik GmbH--; and, in column 8, line 24 (line 1 of claim 6), change "the" to --and--.

Signed and Sealed this

Twenty-fourth Day of April, 2001

Attest:

NICHOLAS P. GODICI

Attesting Officer   Acting Director of the United States Patent and Trademark Office